(12) United States Patent
Mola et al.

(10) Patent No.: US 9,127,714 B2
(45) Date of Patent: Sep. 8, 2015

(54) CREEP PREVENTION DEVICE FOR A RING OF A ROLLING BEARING AND BEARING EQUIPPED THEREWITH

(71) Applicant: Aktiebolaget SKF, Göteborg (SE)

(72) Inventors: Roberto Mola, Turin (IT); Riccardo Restivo, Turin (IT); Gianpiero Scaltriti, Turin (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/055,967

(22) Filed: Oct. 17, 2013

(65) Prior Publication Data

US 2014/0105530 A1    Apr. 17, 2014

(30) Foreign Application Priority Data

Oct. 17, 2012 (IT) .............................. TO2012A0918

(51) Int. Cl.
| | |
|---|---|
| F16C 43/00 | (2006.01) |
| F16C 35/07 | (2006.01) |
| F16C 33/58 | (2006.01) |
| F16C 35/067 | (2006.01) |

(52) U.S. Cl.
CPC ............... *F16C 35/07* (2013.01); *F16C 33/586* (2013.01); *F16C 35/067* (2013.01)

(58) Field of Classification Search
CPC ........ F16C 19/06; F16C 23/06; F16C 33/586; F16C 35/067; F16C 35/07; F16C 35/073; F16C 35/077

USPC ......... 384/456, 537, 538, 510, 519, 583, 584, 384/903
See application file for complete search history.

(56) References Cited

U.S. PATENT DOCUMENTS

| | | | | | |
|---|---|---|---|---|---|
| 3,007,753 | A | * | 11/1961 | Potter ........................... | 384/538 |
| 3,669,519 | A | * | 6/1972 | Takahashi ..................... | 384/539 |
| 4,511,191 | A | * | 4/1985 | Kitamura ...................... | 384/536 |
| 4,545,627 | A | * | 10/1985 | Nakamura et al. ............ | 384/585 |

(Continued)

FOREIGN PATENT DOCUMENTS

| | | |
|---|---|---|
| DE | 7317297 U | 8/1973 |
| DE | 202006008982 U1 | 8/2006 |

(Continued)

*Primary Examiner* — James Pilkington
(74) *Attorney, Agent, or Firm* — Bryan Peckjian; SKF USA Inc. Patent Dept.

(57) ABSTRACT

A device including an annular groove obtained on a lateral assembly surface of a ring of a bearing in contact in use with a seat with respect to which the ring must remain stationary; a first element shaped as a circumferentially open ring and preferably defined by a circumferential ring segment having a non-constant radial thickness (S) and always smaller than a radial depth (P) of the annular groove, mounted within the annular groove free to move circumferentially in the annular groove; and a second element, shaped as a closed ring, which engages the annular groove, within which it is mounted radially superimposed on the first element on the side of the lateral assembly surface and having a constant radial thickness (F) such that the second element protrudes radially and overhangingly with respect to the lateral assembly surface at least in correspondence with part of the first element.

10 Claims, 3 Drawing Sheets

(56) References Cited

U.S. PATENT DOCUMENTS

| | | | | |
|---|---|---|---|---|
| 5,785,433 | A * | 7/1998 | Takahashi et al. | 384/539 |
| 6,715,925 | B2 * | 4/2004 | Pairone et al. | 384/536 |
| 8,388,232 | B2 * | 3/2013 | Iida et al. | 384/535 |
| 2010/0158424 | A1 * | 6/2010 | Muramatsu | 384/548 |
| 2014/0035374 | A1 | 2/2014 | Oka | |

FOREIGN PATENT DOCUMENTS

| | | |
|---|---|---|
| EP | 1296077 A2 | 3/2003 |
| JP | 2000087988 A | 3/2000 |
| JP | 2005042894 A | 2/2005 |
| JP | 2011094727 A | 5/2011 |
| JP | 2011247396 A | 12/2011 |

* cited by examiner

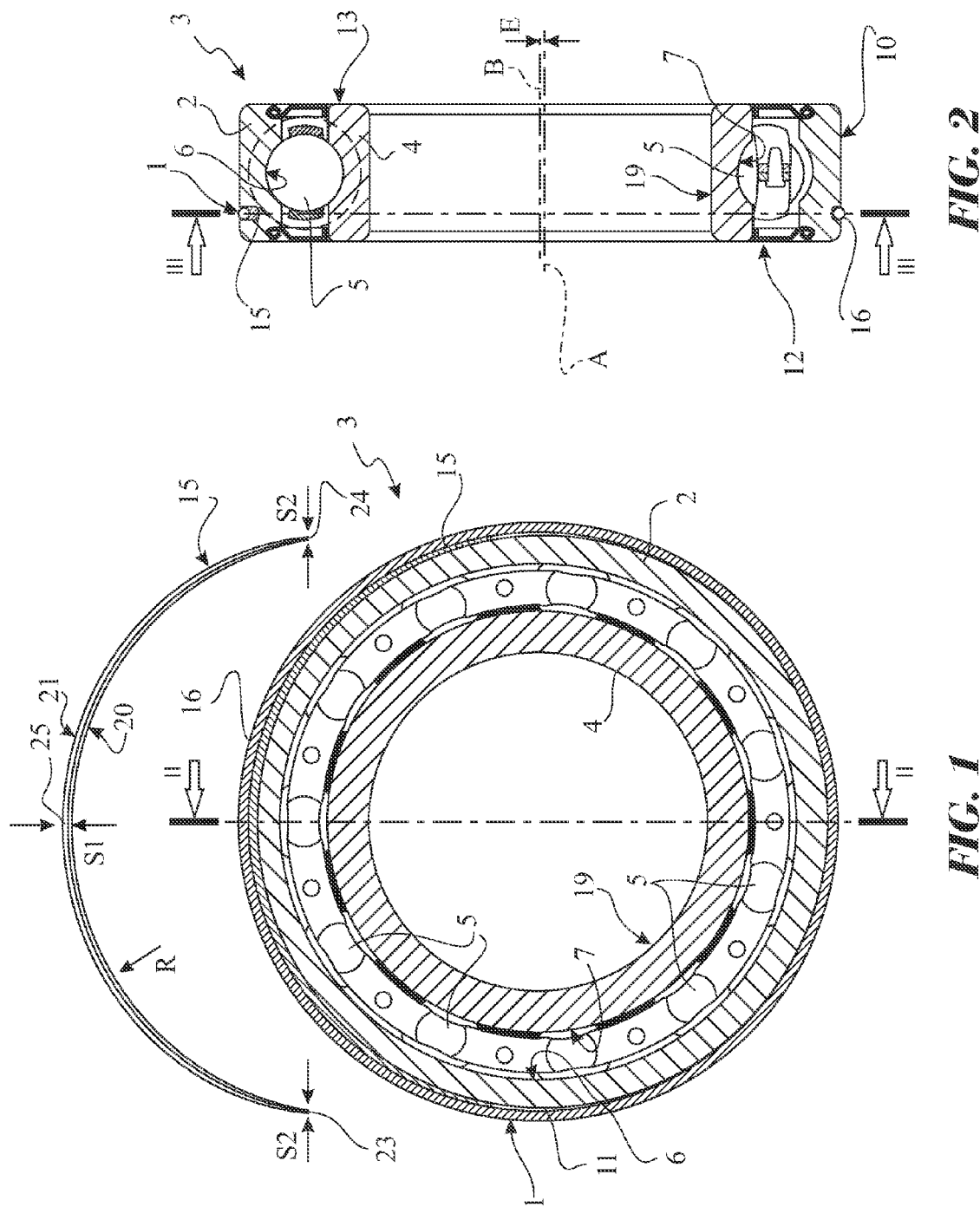

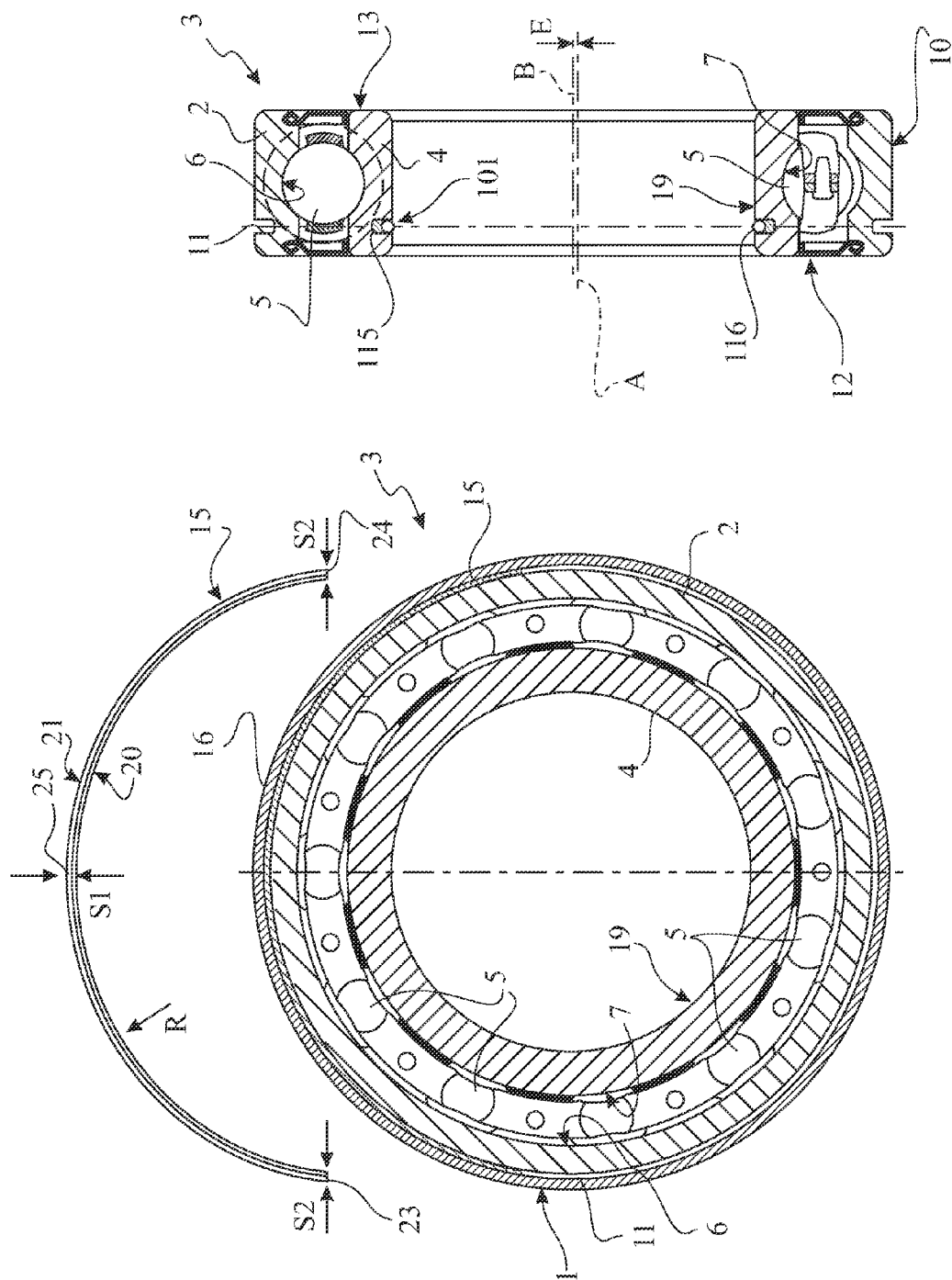

US 9,127,714 B2

CREEP PREVENTION DEVICE FOR A RING OF A ROLLING BEARING AND BEARING EQUIPPED THEREWITH

CROSS-REFERENCE

This application claims priority to Italian Patent Application No. TO2012A000918 filed on Oct. 17, 2012, the contents of which is incorporated herein by reference.

TECHNICAL FIELD

The present invention relates to a creep prevention device for a ring of a rolling bearing and to a rolling bearing equipped with this creep prevention device.

RELATED ART

In rolling bearing of the DGBB (Deep Groove Ball Bearing) type, the bearing behaves as an epicyclical reduction gear due to the radial depth of the rolling grooves for the revolving bodies, and also the outer ring may be brought in rotation following the rotation of the inner ring and of the revolving bodies, usually balls, on themselves and about the rolling bearing axis.

In some applications, such as the one described in EP1296077 in which the assembly seat is made of plastic material, a groove is made on the outside of the outer ring. During the co-molding of the bearing with the seat, such a groove is filled with plastic material of the seat to prevent the rotation of the outer ring.

However, this solution is not feasible when the seat cannot be co-molded with the bearing or when the concerned assembly seat (stationary seat) is the one in contact with the inner ring.

In these cases, the adopted solution, e.g. such as those taught in JP2011247396A and JP201194727A, is usually to obtain an eccentric annular groove on the ring which must remain stationary in contact with the assembly seat, in which an o-ring or an elastic ring or half ring is arranged, these generally having complex shape with either linear or protruding stretches and of thickness and/or shape such to protrude radially outside the groove and towards the assembly seat.

Although fully satisfactory and relatively simple, such solutions require the o-ring or ring or half ring to protrude from the groove by a relatively high extent in order to be efficient. This may cause problems in achieving the required centering accuracy of the bearing with respect to the assembly seat.

It is an object of the present invention to provide a creep prevention device for a ring of a rolling bearing and a rolling bearing equipped with this creep prevention device, which allow to obtain a perfect bearing-assembly seat centering with efficacy either equal to or higher than that of the known devices. It is a further object of the present invention a creep prevention device and the respective rolling bearing equipped with the creep prevention device which have low costs and high ease of production, high ease and rapidity of assembly, small dimensions, low weight and high reliability.

SUMMARY

According to the invention, a creep prevention device for a ring of a rolling bearing and a rolling ring equipped with this creep prevention device are thus provided.

By virtue of the invention, the creep prevention device is very effective also when the components thereof protrude radially a little or nearly not at all from the lateral surface of the ring of the bearing intended to remain in contact, in use, with the seat with respect to which the ring must remain stationary.

An effective creep prevention action combined with a high reliability of the creep prevention device and a high assembly accuracy of the bearing is obtained in this manner.

BRIEF DESCRIPTION OF THE DRAWINGS

Further features and advantages of the present invention will be apparent in the description of the following non-limitative embodiment thereof, with reference to the accompanying drawings, in which:

FIG. 1 shows a front elevation view, taken along a median plane perpendicular to the symmetry axis of a rolling bearing equipped with a creep prevention device made according to the invention with a component of the device shown both in assembly position and in exploded configuration, for greater clarity;

FIG. 2 shows a longitudinal elevation view, shown in radial section taken along a plotting line II-II, of the rolling bearing in FIG. 1;

FIG. 5 shows a front elevation view of a variant of the roller bearing equipped with a creep prevention device of FIG. 1, wherein a groove is formed having a constant depth measured in a direction parallel to an axially oriented symmetry axis; and FIG. 6 shows a longitudinal elevation view, shown in radial section, of a variant of the rolling bearing in FIG. 1, wherein the inner ring includes the creep prevention device.

DETAILED DESCRIPTION OF THE INVENTION

Figure 4:
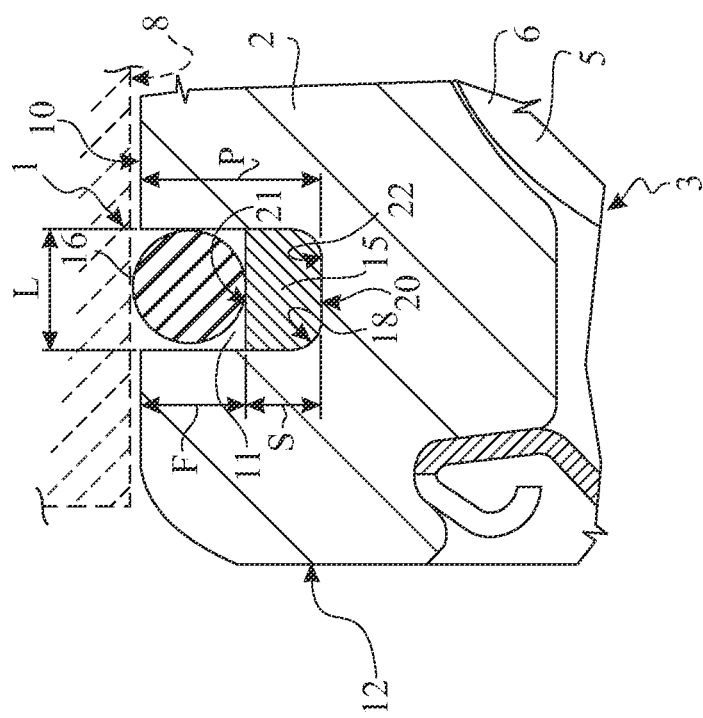
FIG. 4 shows a view in radial section and on further enlarged scale of a detail in FIG. 2.
Figure 3:
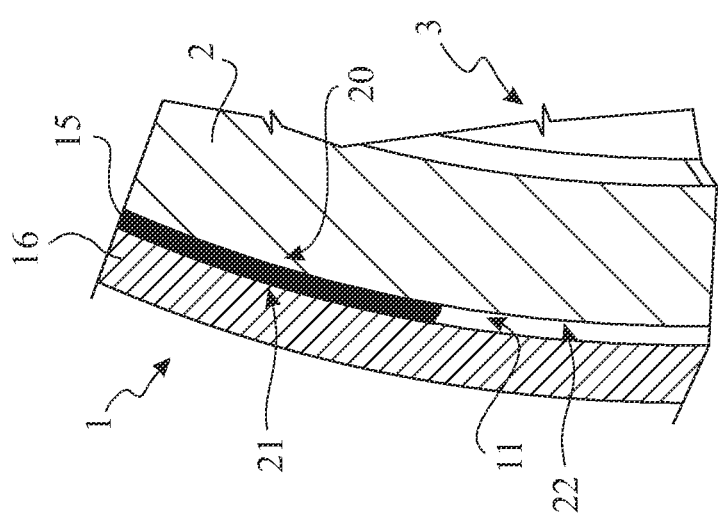
FIG. 3 shows a front elevation view on enlarged scale taken along a plotting line III-III of the rolling bearing in FIGS. 1 and 2.

With reference to FIGS. 1 to 4, reference numeral 1 (FIG. 4) as a whole shows a creep prevention device for a ring 2 of a rolling bearing 3.

The rolling bearing 3 has a symmetry axis A and comprises an outer ring, in the non-limiting embodiment in point constituted by the ring 2, an inner ring 4, a plurality of revolving bodies 5, balls in the case in point, arranged between the outer ring 2 and the inner ring 4 and engaged in respective rolling tracks 6 and 7 of the outer ring 2 and the inner ring 4, respectively, and the creep prevention device 1, which is carried according to the invention by a first of the inner 4 and the outer ring 2 in contact in use with a seat 8 (FIG. 4) with respect to which the bearing 3 must remain stationary; in the illustrated case in point, the creep prevention device 1 is integrally carried by the outer ring 2, a lateral outer lateral assembly surface 10 of which is in contact in use with the seat 8.

The rings 2 and 4 are concentric with respect to axis A and the creep prevention device 1 comprises at least one annular groove 11 obtained on the lateral assembly surface 10 so as to obtain a radial shallow recess on the cylindrical lateral surface 10. Preferably, the annular groove 11 is obtained near a front end 12 of the bearing 3; in a possible variant (not shown for the sake of simplicity) an identical annular groove may be obtained near a front end 13 of the bearing 3, opposite to end 12.

According to the invention, the creep prevention device 1 further comprises in combination, for each annular groove 11 present on the ring 2: a first element 15, shaped as a circumferentially opened ring (and thus defining a half ring or semi-annular element 15) and having a radial thickness S (i.e. measured in direction perpendicular to axis A) smaller than a radial depth P (FIG. 4) of the annular groove 11; and a second element 16, shaped as a closed ring, which also engages the annular groove 11, within which the element or ring 16 is radially mounted, superimposed on the first element or half ring 15 on the side thereof facing toward the lateral assembly surface 10.

According to an aspect of the invention, the half ring 15 is entirely mounted within the annular groove 11, free to turn circumferentially in the annular groove 11, within a bottom portion 18 (FIG. 4) of the annular groove 11.

The closed ring 16 has a constant radial thickness F, of measure such that, at least in correspondence with part of the first element or half ring 15, the second element or half ring 16 radially and overhangingly protrudes, at least in part, with respect to the lateral assembly surface 10, so that, at least in a circumferential spot of the annular groove 11, the sum of the thicknesses S and F is higher than the value of depth P (and thus the S+F>P ratio applies).

In the non-limiting example shown, the lateral assembly surface 10 is the radially outer surface of the outer ring 2 of the bearing 3. It is however apparent for a person skilled in the art that the description above and the one that will follow can be applied, mutatis mutandis, also to the case in which the lateral assembly surface is a radially inner lateral surface 19 of the inner ring 4 and the seat 8 is thus defined by the lateral outer surface of a shaft or other mechanical cylindrical element.

The first element or half ring 15 is defined by a circumference segment or stretch or piece of ring having a circumferential arc-of-a-circle profile and, according to an aspect of the invention, a non-constant radial thickness S such that when the element 15 is mounted in the annular groove 11, the element 15 is always arranged symmetrically with respect to a radial plane of the bearing ring (defined by plotting line II-II in FIG. 1) passing through the middle line (i.e. at the median circumferential point) of the element or half ring 15.

In particular, the element or half ring 15 has a radial section of shape and dimensions complementary to those of the bottom portion 18 of the annular groove 11 (in the non-limiting case in point, essentially rectangular with rounded vertexes facing the side opposite to the surface 10) and is delimited by a lateral radially inner surface 20 and by a lateral radially outer surface 21.

The lateral surface 20 is a cylindrical surface having a radius of curvature R identical to that of a bottom wall 22 (FIGS. 3 and 4) of the annular groove 11, which bottom wall delimits the bottom portion 18 on the side opposite to the surface 10; the lateral surface 21 is a curved surface having a continuously variable radius (in reduction) towards opposite circumferential ends 23 and 24 of the element or half ring 15.

Therefore, the element 15 has a maximum radial thickness S1 at a median portion 25 thereof to gradually taper off, on the side of the lateral surface 21 and in a radial direction toward the bottom portion 18 of the annular groove 1, towards both opposite ends 23 and 24 thereof, where a radial thickness S2 smaller than the thickness S1 is reached. Furthermore, according to a preferred aspect of the invention, the element or half ring 15 has a circumferential extension equal to less than a half of the circumferential extension of the annular groove 11, as clearly shown in FIG. 1.

According to the invention, while the S1+F>P ratio is always applicable, the sum of the radial thicknesses S2 and F may also be only equal to or lower than P; the element or closed ring 16, thus, always protrudes radially from the annular groove 11 and with respect to the lateral surface 10 only at the median portion 25 of the half ring 15.

According to a further important aspect of the invention, both the first and the second element 15 and 16 are elastically deformable elements, in particular in radial direction; for this purpose, the first element or half ring 15 is made of a synthetic plastic material, so as to be elastically deformable and adapted to slide in practice within the groove portion 11 with low friction, but be also provided with a given rigidity, while the second element or closed ring 16 is made of an elastomeric or rubbery material and preferably consists of an o-ring.

According to a variant of the first possible embodiment of the invention, illustrated in FIG. 5, in combination with the above, the annular groove 11 has a constant depth P (identified in FIG. 4) measured in a radial direction and a constant width L measured in a direction parallel to symmetry axis A. Thus, the sum of the radial thicknesses S1 of the element 15 and F of the element 16 will be greater than the depth P only along a circumferential stretch of the annular grove 11 arranged in an angular position corresponding to that of the median portion 25 of the element 15, when the element 15 is engaged in the groove 11.

According to a preferred embodiment of the invention, however, the annular groove 11 is eccentric parallelly to a median plane of the bearing ring, median plane which is perpendicular to the symmetry axis A of the ring 2 of the bearing 3, and which in FIG. 2 is parallel to the plotting line III-III. Therefore, the symmetry axis of the groove 11 will be an axis B (FIG. 2) parallel to axis A, but eccentric with respect to axis A, namely laterally spaced apart from axis A by a quantity E (eccentricity) and the annular groove 11 has, in diametrically opposite positions, a maximum depth Pmax and a minimum depth Pmin respectively, such that Pmax−Pmin=2E.

In this case, while the element 16 continues to have a constant radial thickness F in circumferential direction, the first element 15 has instead a variable radial thickness S in circumferential direction chosen so as to compensate for the eccentricity E of the annular groove 11 with respect to the axis A of the bearing ring 2. Therefore, according to this embodiment, the second element 16 protrudes in part (by a constant radial thickness F chosen so as to be just greater than the minimum radial thickness Pmin of the annular groove 11) radially overhanging from the lateral assembly surface 10 along the entire circumferential extension thereof.

According to another variant of the first possible embodiment of the invention, illustrated in FIG. 6, the creep prevention device 101 is carried by one of the inner and outer ring. The creep prevention device 101 includes a first element 115 and a second element 116, both the first element 115 and the second element 116, which are carried according to the invention by one of the inner ring 4 (as shown in FIG. 6) and the outer ring 2 (as shown in FIG. 2)."

By virtue of the described structure, and in particular of the combination of the two elements, such as element 15 (incomplete, tapered ring) and element 16 (complete rubbery, elastic ring) a very effective, marked creep prevention can be obtained also in presence of very deep tracks 6,7 with minimum interference between seat 8 and ring 16, which is mostly concentrated only on a very limited circumferential portion of the ring 16. Furthermore, the half ring 15 exerts the "wedge" effect thereof more effectively if the half ring 16 is tapered at the ends 23, 24 or/and if the annular groove 11 is obtained eccentrically with respect to axis A, which further improves the performance of the device 1.

The invention claimed is:

1. A creep prevention device for a bearing ring of a rolling bearing comprising:
   an annular groove disposed on a lateral assembly surface of the bearing ring in contact with a seat with respect to which the bearing ring must remain stationary,
   a first element, shaped as a half ring being opened circumferentially and having a non-constant radial thickness smaller than a radial depth of the annular groove, mounted within the annular groove and free to move circumferentially within the annular groove; and
   a second element, shaped as a closed ring and having a constant radial thickness, wherein the second element is, radially mounted superimposed on the first element on the side of the lateral assembly surface, wherein the second element is partially located within the annular groove such that the second element protrudes in part in a radial manner from the lateral assembly surface along a portion of the second element being supported by at least at a portion of the first element;
   wherein the first element is symmetric with respect to a radial plane of the bearing ring when the first element is mounted in the annular groove; and
   the first element having a circumferential extension equal to less than a half of a circumferential extension of the annular groove.

2. The device according to claim 1, wherein an arch of the first element is defined as having a middle portion centrally located between two ends,
   wherein the shape and size of a radial cross section shape of the first element are complementary with a mating surface of the annular groove,
   wherein the radial cross section shape has a maximum radial thickness at the middle portion of the arch of the first element and the radial dimension of the cross section shape of the arch of the first element gradually reduces as the cross section shape extends towards each respective end of the radial cross section shape of the arch of the first element.

3. The device according to claim 1, wherein both the first and the second element are elastically deformable.

4. The device according to claim 1, wherein the first element is made of a synthetic plastic material, while the second element is made of an elastomeric material.

5. The device according to claim 1, wherein the second element is an o-ring.

6. The device according to claim 1, wherein the annular groove has a constant depth, measured in a radial direction, and a constant width, measured in a direction parallel to an axially oriented symmetry axis of the bearing ring; wherein the sum of the radial thicknesses of the first and the second element along at least one circumferential stretch of the annular groove is greater than the depth in radial direction of the annular groove.

7. The device according to claim 1, wherein the annular groove is eccentric with respect to the axially oriented symmetry axis of the bearing ring.

8. The device according to claim 7, wherein the second element has a constant radial thickness in a circumferential direction, while the first element has a non-constant radial thickness in the circumferential direction to compensate the eccentricity of the annular groove, wherein the second element partially protrudes in radial manner from the lateral assembly surface along the whole circumferential extension of the second element.

9. A rolling bearing comprising:
   an outer ring,
   an inner ring,
   a plurality of revolving bodies arranged between the outer ring and in the inner ring and engaged in respective rolling tracks of the outer and inner ring,
   an annular groove formed within a lateral assembly surface of a first one of the inner ring and the outer ring, and
   a creep prevention device carried by one of the inner and outer ring, the creep prevention device having:
   a first element, shaped as a half ring being opened circumferentially and having a non-constant radial thickness smaller than a radial depth of the annular groove, mounted within the annular groove and free to move circumferentially within the annular groove;
   a second element, shaped as a closed ring and having a constant radial thickness, wherein the second element is, radially mounted superimposed on the first element on the side of the lateral assembly surface, wherein the second element is partially located within the annular groove such that the second element protrudes in part in radial manner from the lateral assembly surface along a portion of the second element being supported by at least at a portion of the first element; and
   a seat in contact with the lateral assembly surface and the second element,
   wherein the first element is symmetric with respect to a radial plane of the bearing ring when the first element is mounted in the annular groove; and
   the first element having a circumferential extension equal to less than a half of a circumferential extension of the annular groove, and
   carried by the first one of the inner and outer rings in contact with a seat with respect to which the bearing must remain stationary.

10. The bearing according to claim 9, wherein the lateral assembly surface is a radially outer surface of the outer ring.

* * * * *